(12) United States Patent
Zheng et al.

(10) Patent No.: US 12,358,245 B2
(45) Date of Patent: Jul. 15, 2025

(54) SYSTEMS AND METHODS FOR INSERT PLACEMENT TO FABRICATE HYBRID CONTACT LENSES

(71) Applicant: Alcon Inc., Fribourg (CH)

(72) Inventors: Yang Zheng, Alpharetta, GA (US); Cornelius Daniel Niculas, Suwanee, GA (US); Yuan Chang, Chicago, IL (US); Junhao Ge, Shanghai (CN); Steve Yun Zhang, Sugar Hill, GA (US); Justin Joel Aguayo, Duluth, GA (US); David Andrew Icenogle, Brookhaven, GA (US); Muhammad Waqas Asif, Madison, WI (US); Daryl Reece, Atlanta, GA (US)

(73) Assignee: Alcon Inc., Fribourg (CH)

( * ) Notice: Subject to any disclaimer, the term of this patent is extended or adjusted under 35 U.S.C. 154(b) by 159 days.

(21) Appl. No.: 18/070,189

(22) Filed: Nov. 28, 2022

(65) Prior Publication Data

US 2023/0166467 A1     Jun. 1, 2023

Related U.S. Application Data

(60) Provisional application No. 63/283,718, filed on Nov. 29, 2021.

(51) Int. Cl.
 B29D 11/00       (2006.01)
 B29K 83/00       (2006.01)
 (Continued)

(52) U.S. Cl.
 CPC .. B29D 11/00519 (2013.01); B29D 11/00038 (2013.01); G02B 1/043 (2013.01);
 (Continued)

(58) Field of Classification Search
 CPC ........ B29D 11/00038; B29D 11/00519; B29D 11/0024
 See application file for complete search history.

(56) References Cited

U.S. PATENT DOCUMENTS 3,380,718 A * 4/1968 Neefe .............. B29D 11/00009
                                                          425/808
5,632,936 A * 5/1997 Su .................... B29D 11/00057
                                                          425/176

(Continued)

FOREIGN PATENT DOCUMENTS

EP      0680819 A1   11/1995
EP      2295229 A2    3/2011
WO   WO-0059713 A1 * 10/2000   ......... B29C 35/0894

*Primary Examiner* — Virak Nguon
(74) *Attorney, Agent, or Firm* — Jian Zhou

(57) ABSTRACT

Systems, devices, and methods are disclosed for fabricating a hybrid contact lens product having a lens insert embedded at a precisely controlled location within a lens body. A mold engagement and support base engages and retains a lens forming mold in a substantially fixed position. An insert placement and positioning device includes an insert pickup head with a contact face configured for releasable engagement of the lens insert and at least one suction opening in the contact face for applying suction to engage the insert on the contact face. A positioning housing interacts with the mold and/or the support base to provide precise locational positioning of the lens insert within the mold. A lens body forming material is delivered to the mold to encapsulate the lens insert.

28 Claims, 12 Drawing Sheets

(51) Int. Cl.
　　　*B29K 105/00*　　　(2006.01)
　　　*G02B 1/04*　　　(2006.01)
　　　*G02C 7/04*　　　(2006.01)
(52) U.S. Cl.
　　　CPC ............ *G02C 7/04* (2013.01); *B29K 2083/00* (2013.01); *B29K 2105/0061* (2013.01)

(56) References Cited

U.S. PATENT DOCUMENTS

| | | | | |
|---|---|---|---|---|
| 2009/0133624 | A1* | 5/2009 | Takahashi | B29D 11/00923 118/712 |
| 2013/0188123 | A1* | 7/2013 | Dean | B29D 11/00067 264/2.6 |
| 2014/0197558 | A1* | 7/2014 | Linhardt | B29D 11/00038 264/1.7 |
| 2016/0200057 | A1* | 7/2016 | Clements | B65B 35/18 206/5.1 |
| 2019/0300654 | A1* | 10/2019 | Wu | B29D 11/00067 |

\* cited by examiner

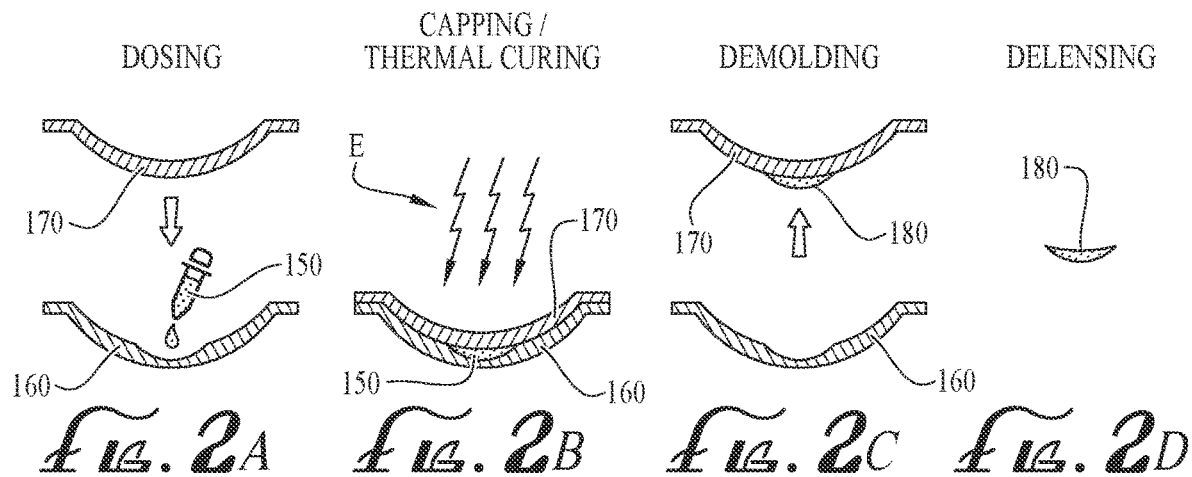
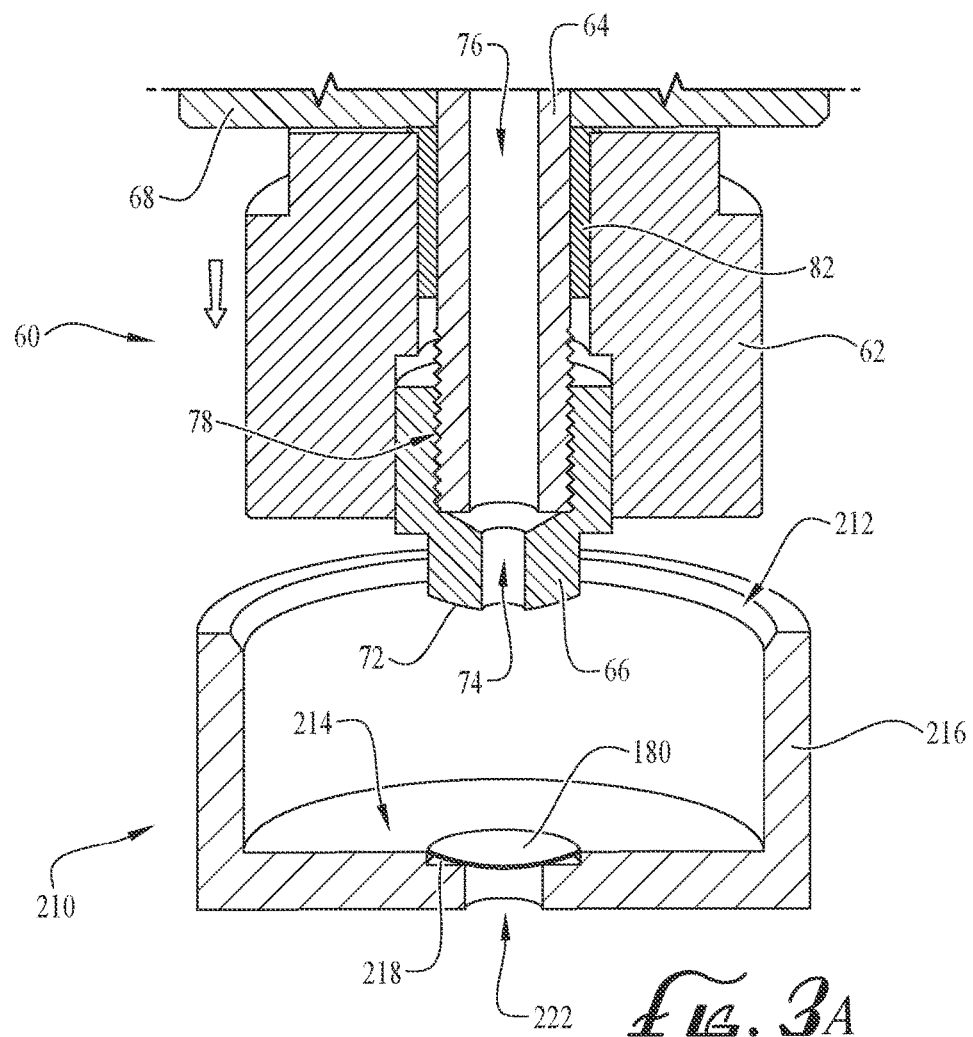

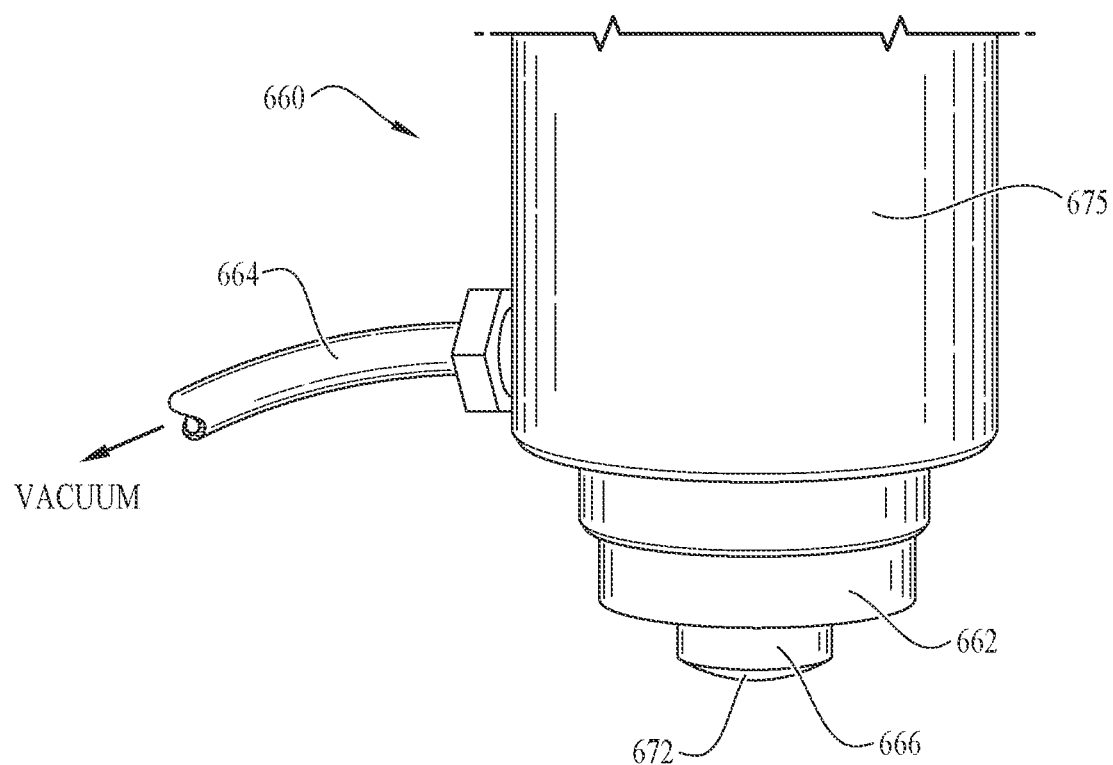

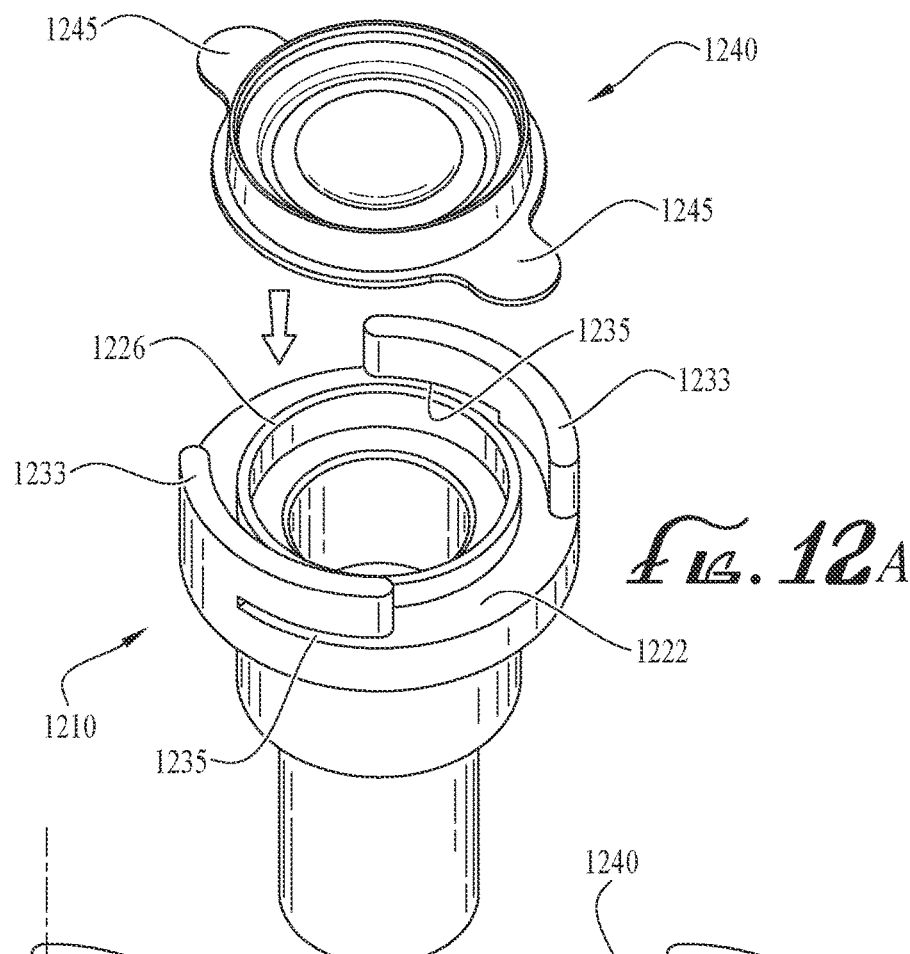
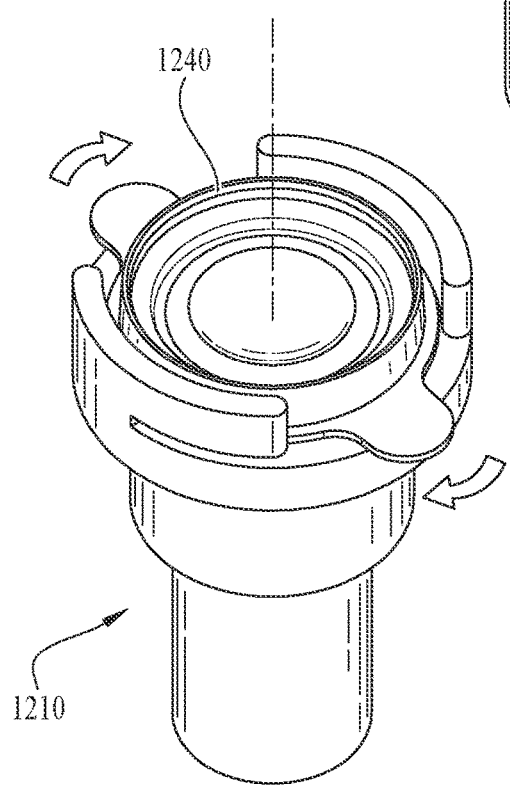
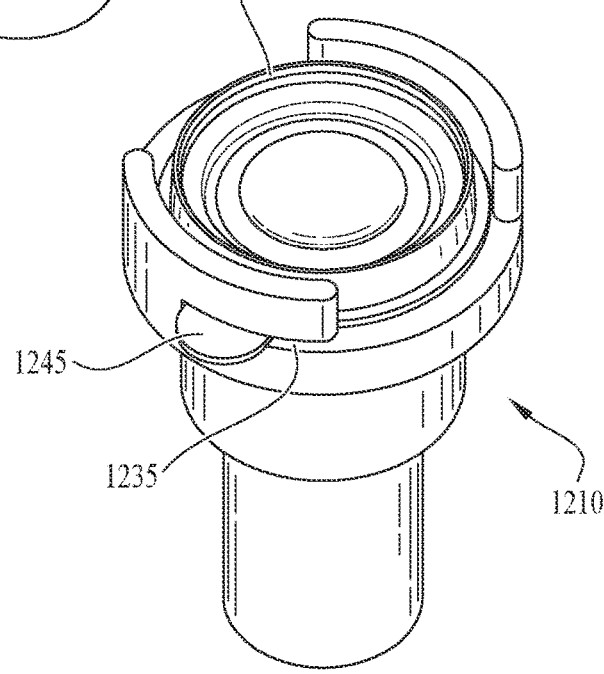
FIG. 12A
FIG. 12B
FIG. 12C

SYSTEMS AND METHODS FOR INSERT PLACEMENT TO FABRICATE HYBRID CONTACT LENSES

TECHNICAL FIELD

The present invention relates generally to the field of fabrication of products including ophthalmic contact lenses, and more particularly to devices, systems, and methods for forming a hybrid contact lens with an embedded lens insert or forming other molded products with an embedded insert.

BACKGROUND

Various products are fabricated or manufactured by molding or casting processes. For example, optical contact lenses and other products may be fabricated by delivery of one or more lens forming materials such as uncured monomeric lens precursor material(s) into a mold or other forming device or structure, curing the materials to form a polymeric contact lens or other product, and demolding the lens or other product for further treatment or use.

In some particular examples, it may be desirable to manufacture a hybrid product having an insert portion formed of a different material that is embedded within the molded product. For example, a hybrid contact lens may include a lens insert portion formed of a first material, which is embedded within a lens body formed of a second material.

Precise placement or positioning of the insert within the lens body may be critical to the performance of a hybrid contact lens. Previously known systems and methods for fabrication of hybrid contact lenses, including voxel-based lithography, 3-D printing, and lathe cutting may disadvantageously require complex equipment and manufacturing processes that are not well suited to high-volume automated production. And systems and methods utilizing post structures on the front curve of the lens mold to support the insert during molding typically leave holes or material discontinuities on the surface of the lenses produced, which may render them prone to bacteria growth and/or user discomfort.

Accordingly, it can be seen that needs exist for improved devices, systems, and methods for forming a hybrid contact lens with an embedded lens insert or forming other molded products with an embedded insert. It is to the provision of improved devices, systems, and methods meeting these and other needs that the present invention is primarily directed.

SUMMARY

In example embodiments, the present invention provides improved devices, systems, and methods for forming a hybrid contact lens with a lens insert embedded within a lens body, and/or forming other hybrid molded products with an embedded insert. The invention also includes hybrid contact lenses, optical lenses, and other products produced using such devices, systems and methods. In particular examples, a vacuum or suction (i.e., negative pressure relative to ambient) actuated system provides precise placement and positioning of a lens insert at the desired axial and radial location in a lens mold. Example embodiments of the system and method eliminate the need for post structures to support the insert during molding, thereby producing hybrid lenses with continuous and intact surfaces to better resist bacteria growth and provide improved comfort. Further, example embodiments may be implemented with limited or minimal modification to existing lens molds and manufacturing systems, without the requirement of complex active placement compensation schemes or equipment, and are readily scalable for high-volume automated production.

In particular applications, the devices, systems, and methods disclosed may be adapted to the manufacture of hybrid contact lenses with rigid gas permeable (RGP) lens inserts or insert lenses fully enclosed by silicone hydrogel (SiHy) lens body carriers. In alternate applications, lenses or other hybrid products may be produced having smaller insert portions of a harder, softer, or otherwise different material than the larger overall lens body; insert portions having a different refractive index or optical power, for example for optical masking or other vision treatment purposes; insert portions comprising a photochromic material, colorant or tinting, and/or insert portions incorporating electronic elements such as a sensor for glucose monitoring or active optics.

In one aspect, the present invention relates to an insert placement and molding system for fabricating a hybrid contact lens product having a lens insert embedded within a lens body, the lens insert comprising a first material and the lens body comprising a second material different from the first material. The insert placement and molding system preferably includes a mold engagement and support base comprising at least one mold engagement feature configured to engage a lens forming mold element and retain the lens forming mold element in a substantially fixed position relative to the mold engagement and support base. The insert placement and molding system preferably also includes an insert placement and positioning device including an insert pickup head, a suction conduit and a positioning housing. The insert pickup head preferably includes an insert contact face configured for cooperative releasable engagement of the lens insert, and at least one suction opening in fluid communication with the suction conduit. The positioning housing preferably includes at least one positioning feature for precise locational positioning of the insert pickup head relative to the lens forming mold element.

In another aspect, the invention relates to an insert placement and positioning device for precisely positioning a lens insert relative to a lens forming mold element to fabricate a hybrid contact lens product. The insert placement and positioning device preferably includes an insert pickup head having an insert contact face configured for cooperative releasable engagement of the lens insert, and at least one suction opening formed in the insert contact face. The insert placement and positioning device preferably also includes a positioning housing including at least one positioning feature for precise locational positioning of the insert pickup head relative to the lens forming mold element. The insert placement and positioning device preferably also includes a suction conduit in fluid communication with the at least one suction opening formed in the insert contact face.

In still another aspect, the invention relates to a method of fabricating a hybrid contact lens product having a lens insert embedded within a lens body, the lens insert comprising a first material and the lens body comprising a second material different from the first material. The method preferably includes the steps of releasably engaging a lens insert comprising a first material onto an insert contact face of an insert placement and positioning device; delivering a first quantity of a second material different from the first material into a mold receptacle of a lens forming mold element; precisely positioning the lens insert in contact with the first quantity of the second material within the mold receptacle of the lens forming mold element, wherein the precise positioning the lens insert is at least partially controlled by positional interaction between at least one positioning feature of a positioning housing of the insert placement and positioning device and the lens forming mold element; releasing the lens insert from engagement with the insert contact face; retracting the insert placement and positioning device from the lens forming mold element; delivering a second quantity of the second material into the mold receptacle of the lens forming mold element to encapsulate the lens insert within the second material; and curing the second material to form a lens body with the lens insert encapsulated within the lens body.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIGS. 2A, 2B, 2C and 2D show a sequence of forming an insert lens portion for a hybrid contact lens according to an example embodiment of the present invention.

FIGS. 3A, 3B and 3C show a sequence of insert lens centering and pick-up by an insert placement and positioning device according to an example embodiment of the present invention.

FIG. 6 shows additional details of an insert placement and positioning device according to an example embodiment of the present invention.

FIGS. 12A, 12B and 12C show a mold engagement pedestal portion of an insert placement and positioning device, and a sequence of engagement of a mold section onto the pedestal according to an example embodiment of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
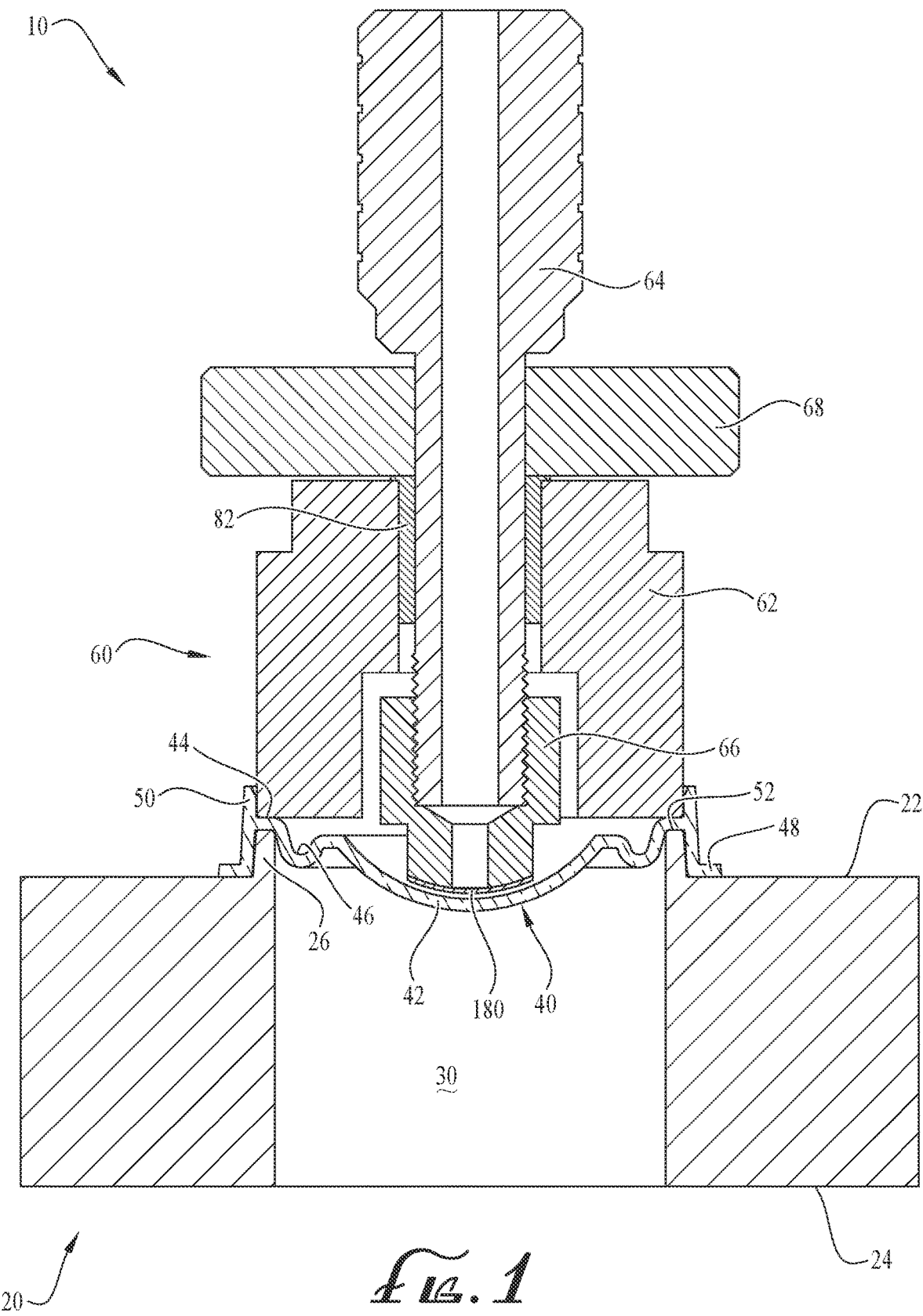
FIG. 1 is a cross-sectional view of an insert placement and molding system according to an example embodiment of the present invention.

With reference now to the drawing figures, wherein like reference numbers represent corresponding parts throughout the several views, FIG. 1 shows a cross-sectional view of an insert placement and molding system 10 according to an example embodiment of the present invention. The system 10 generally includes a mold engagement and support base or pedestal 20, a mold 40, and an insert placement and positioning device 60.

In the depicted example embodiment, the support base or pedestal 20 comprises a cylindrical or otherwise shaped body portion having generally planar or flat top and bottom surfaces 22, 24, an at least partially annular or ring-shaped collar 26 extending upwardly from the top surface 22, and an open chamber 30 extending through the body to a top opening bounded by the collar 26. In example forms the support base or pedestal 20 may be fabricated from stainless steel, aluminum or other metal(s), plastic or other polymeric materials, ceramic, composites, and/or other substantially rigid and durable material(s) of construction.

In the depicted example embodiment, the mold 40 is a lens forming mold element comprising a female or front curve (FC) mold portion or mold half having a generally circular and concave central mold receptacle 42, an annular rim with a flat upper positioning surface 44 surrounding the mold receptacle near the outer periphery of the mold, and a peripheral recess 46 surrounding the mold receptacle adjacent the rim. The mold further comprises a generally L-shaped (in cross-section) external circumferential flange having a generally horizontal base ring portion 48 and a generally vertical upright cylindrical or tubular wall portion 50. An inverted annular recess or channel beneath the upper positioning surface 44 and between the peripheral recess 46 and the upright wall portion 50 forms a receiver 52 for engagement over the collar 26 of the support base 20 when the mold 40 is mounted onto the base. In example forms, the mold 40 may be at least partially formed of a resilient material, and/or the receiver 52 may be configured to closely conform to the collar 26, to retain the mold 40 generally fixed in position relative to the base 20 when mounted, for precise locational control. In further example forms, the mold 40 is at least partially formed from a transparent, translucent, or light-transmissive material to allow UV light to pass through the mold to cure lens-forming material contained in the mold receptacle 42. Alternatively or additionally, the mold 40 is at least partially formed from a thermally conductive material for heat curing of lens forming material contained therein.

In the depicted example embodiment, the insert placement and positioning device 60 comprises a positioning housing 62, a vacuum or suction tube or conduit 64 extending generally centrally and axially through the positioning housing, an insert pick-up head 66 mounted to the vacuum conduit, and a positioning ring 68 coupling the vacuum conduit with the positioning housing. The positioning housing 62 has an external geometry and size (outside diameter) around its base that is configured for a clearance fit (locational, sliding, close running or running) or light interference fit within the inside diameter and geometry of the upright wall portion 50 of the mold 40, thereby providing precise radial or transverse (horizontal) positioning registration between the mold and the positioning housing during use (i.e., a horizontal or X-axis datum location reference). The positioning housing 62 also has a lower contact surface configured and positioned for abutment or contact with the upper positioning surface 44 of the mold 40, thereby providing precise axial (vertical) positioning registration between the mold and the positioning housing during use (i.e., a vertical or Y-axis datum location reference). In example embodiments, these positioning features provide radial placement accuracy or tolerance of about ±0.050 mm or better, and axial placement accuracy or tolerance of about ±0.010 mm or better, and a fixture vertical (axial) tolerance for the distance between the apex and hard stop of about ±0.005 mm or better.

The insert pick-up head 66 has an insert contact face 72 and at least one suction passage or opening 74 formed therein, which is in fluid engagement with the internal lumen 76 of the vacuum tube 64. The insert contact face 72 preferably comprises a smoothly radiused convex surface configured to generally match and closely conform to the back surface of the lens insert or other insert body to be embedded during the molding process, for example having a diameter and a radius of curvature substantially equal to the diameter and radius of curvature of the insert body. A threaded connection 78 between the insert pick-up head 66 and the vacuum tube 64 allows fine and accurate axial adjustment of the relative positioning and spacing between the insert contact face 72 of the pick-up head and the inner surface of the mold receptacle 42 when the positioning housing 62 is fully engaged in registration with the mold 40 for precise axial positioning of the insert during the molding process. The vacuum tube 64 has an internal lumen 76 extending therethrough, and a coupling or connection for attachment via a tube or other conduit to an external vacuum or suction source. The positioning ring or locker 68 may comprise a locking nut that can be manually loosened and tightened by hand to allow adjustment and locking of the axial position of the tip of the pick-up head 66 relative to the hard axial stop of the lower contact surface of the positioning housing at the Y-axis datum location reference. A screw or threaded coupling may be provided between the vacuum tube 64 and the pick-up head 66 for further fine adjustment of the tip positioning in the axial direction. The vacuum tube 64 may be mounted to the housing with a threaded bushing 82 that is press-fit or glued into the fixture housing. In this manner, height adjustment may be provided between the tip of the pick-up head and the apex of the mold, for example by bringing the parts into contact and then backing the tip of the pick-up head away from the mold by a known amount to set the desired offset with the mold apex while holding an embedded insert on the pick-up head.

FIGS. 2A-2D and 3A-3C show sequences of lens insert fabrication, centering, and pickup according to example embodiments of the present invention. In the example sequence of fabricating a lens insert shown in FIGS. 2A-2D, a lens insert forming material 150 is delivered or dosed into the mold receptacle of a female or front-curve insert mold 160 (FIG. 2A). A male or back curve insert mold 170 is then engaged with the front-curve insert mold 160 to encapsulate the lens insert forming material 150 in the closed mold assembly (FIG. 2B). The lens insert forming material 150 is cured within the closed mold assembly, for example by delivery of UV light, heat or other curing energy E. The back curve insert mold 170 is then separated from the front-curve insert mold 160 (FIG. 2C), and the formed lens insert 180 is removed from the mold. In particular example embodiments, the lens insert forming material 150 may be any precursor material suitable for forming a rigid gas permeable (RGP) material or any hard or soft polymeric material having desired mechanical, photochemical, and/or optical properties, as known to a person skilled in the art.

The lens insert 180 may then be transferred to a centering jig or fixture 210, as shown in FIG. 3A. In the depicted example, the centering jig or fixture 210 comprises a generally cylindrical housing with a chamfered top opening 212, a floor 214 at the bottom, and a cylindrical sidewall 216. A recess 218 is formed at the center of the floor 214, concentric with the fixture housing 210. The recess 218 preferably has a size and shape closely conforming to the size and shape of the lens insert 180. In example forms, the recess 218 has a slightly larger diameter than the diameter of the lens insert 180, so that the lens insert can be inserted into and removed from the recess without substantial interference or deformation. A relief opening 222 is preferably formed through the floor 214 below the recess 218 to prevent vacuum or pressure from interfering with insertion and removal of the lens insert 180 to and from the recess. Placement of the lens insert 180 within the recess ensures a precise and consistent positioning of the lens insert for insert pick-up.

Figure 3B:
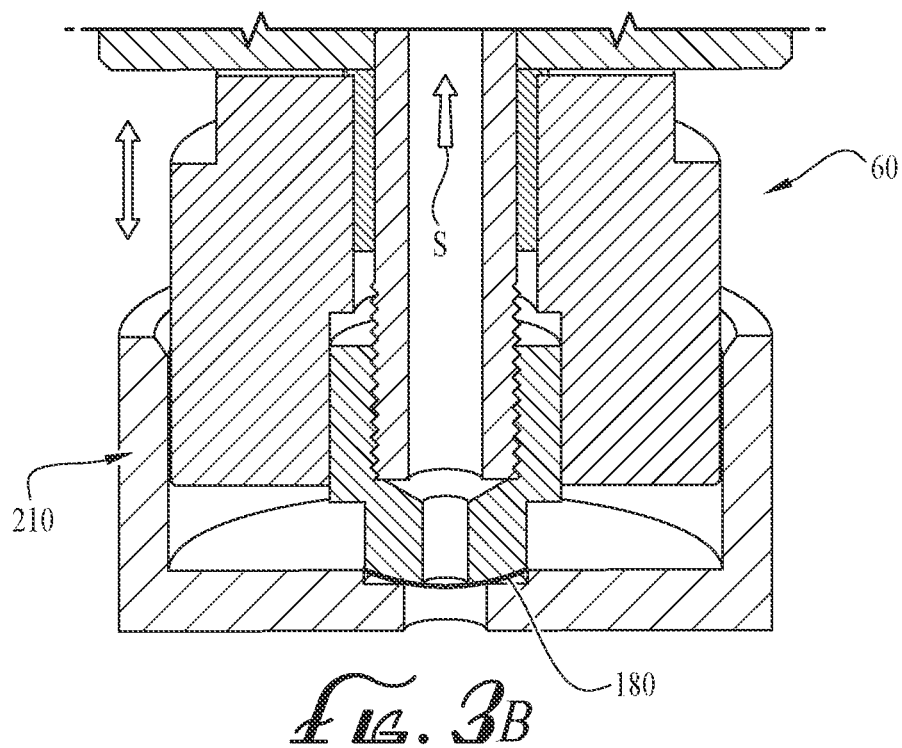
Figure 3C:
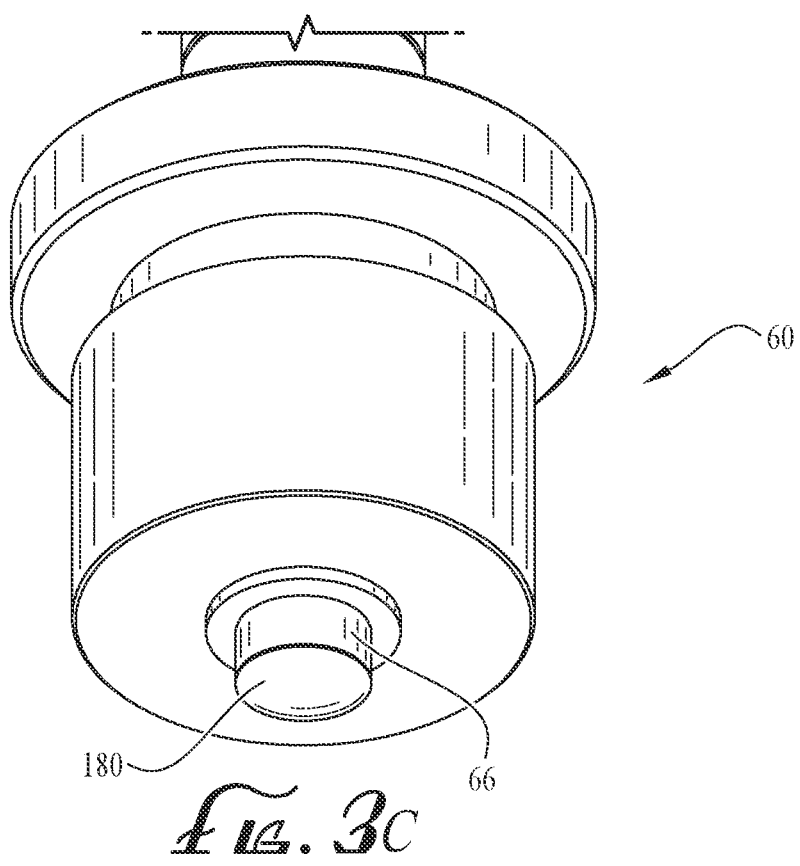

The insert placement and positioning device 60 is then lowered into the centering jig or fixture 210 as shown in FIG. 3B. The inside geometry of the chamfered top opening 212 and sidewall 216 of the centering jig or fixture 210 are preferably configured to receive and closely conform to the outside geometry of the insert placement and positioning device 60 to further ensure precise and consistent positioning of the lens insert 180 on the insert contact face 72 of the pick-up head 66 when the lens insert is transferred from the centering jig to the pick-up head. Vacuum or suction S is applied through the vacuum tube 64 and the at least one suction passage or opening 74 of the pick-up head 66 to releasably secure the lens insert 180 on the insert contact face 72 of the pick-up head 66 and cause the lens insert to be lifted out of the recess 218 when the insert placement and positioning device 60 is raised out of the centering jig or fixture 210 as shown in FIG. 3C.

Figure 4A:
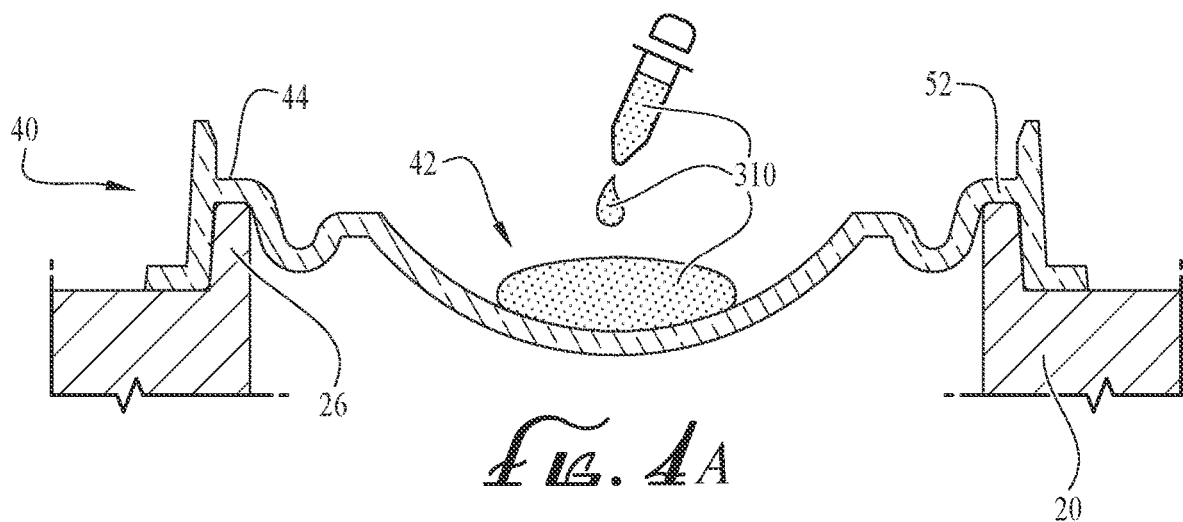
FIGS. 4A, 4B, 4C, 4D, 4E and 4F show a sequence of placement and positioning of an insert lens and molding of the lens body to encapsulate the insert lens according to an example embodiment of the present invention.

FIGS. 4A-4F show a sequence of forming a molded product having a smaller insert portion formed of a first material that is embedded within a larger overall body portion formed of a different second material, without the need for post structures to support the insert during molding. In the depicted embodiment, the molded product is a hybrid contact lens having an embedded lens insert. The mold 40 is mounted onto the support base 20 with the mold's receiver channel 52 engaged onto the collar 26 of the base. A first quantity of uncured lens body forming material 310 is delivered or dosed into the mold receptacle 42 as shown in FIG. 4A. The lens body forming material 310 may be delivered to the mold receptacle 42 by means of a pipette, a syringe, a pump, or other manual or automated dosing, dispensing or delivery means. The first quantity of lens body forming material 310 is sufficient to be in contact with the lens insert 180 when positioned as described below. In particular example embodiments, the lens body forming material 310 may be any precursor material (i.e., hydrogel lens formulation) for forming a soft polymeric material, such as, a non-silicone hydrogel material (i.e., a hydrogel material free of silicone) or a silicone hydrogel (SiHy) material.

A "hydrogel" or "hydrogel material" refers to a cross-linked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, bufilcon A, crofilcon A, deltafilcon A, etafilcon A, focofilcon A, helfilcon A, helfilcon B, hilafilcon B, hioxifilcon A, hioxifilcon B, hioxifilcon D, lidofilcon A, lidofilcon B, mafilcon A, methafilcon A, methafilcon B, nelfilcon A, nesofilcon A, netrafilcon A, ocufilcon A, ocufilcon B, ocufilcon C, ocufilcon D, omafilcon A, omafilcon B, perfilcon A, phemfilcon A, polymacon, samfilcon A, surfilcon A, tefilcon A, tetrafilcon A, vasurfilcon A, and vilfilcon A.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, kalifolcon A, lehfilcon A, lotrafilcon A, lotrafilcon B, narafilcon A, narafilcon B, samfilcon A, senofilcon A, senofilcon B, senofilcon C, sifilcon A, somofilcon A, stenfilcon A, verofilcon A.

Figure 4B:
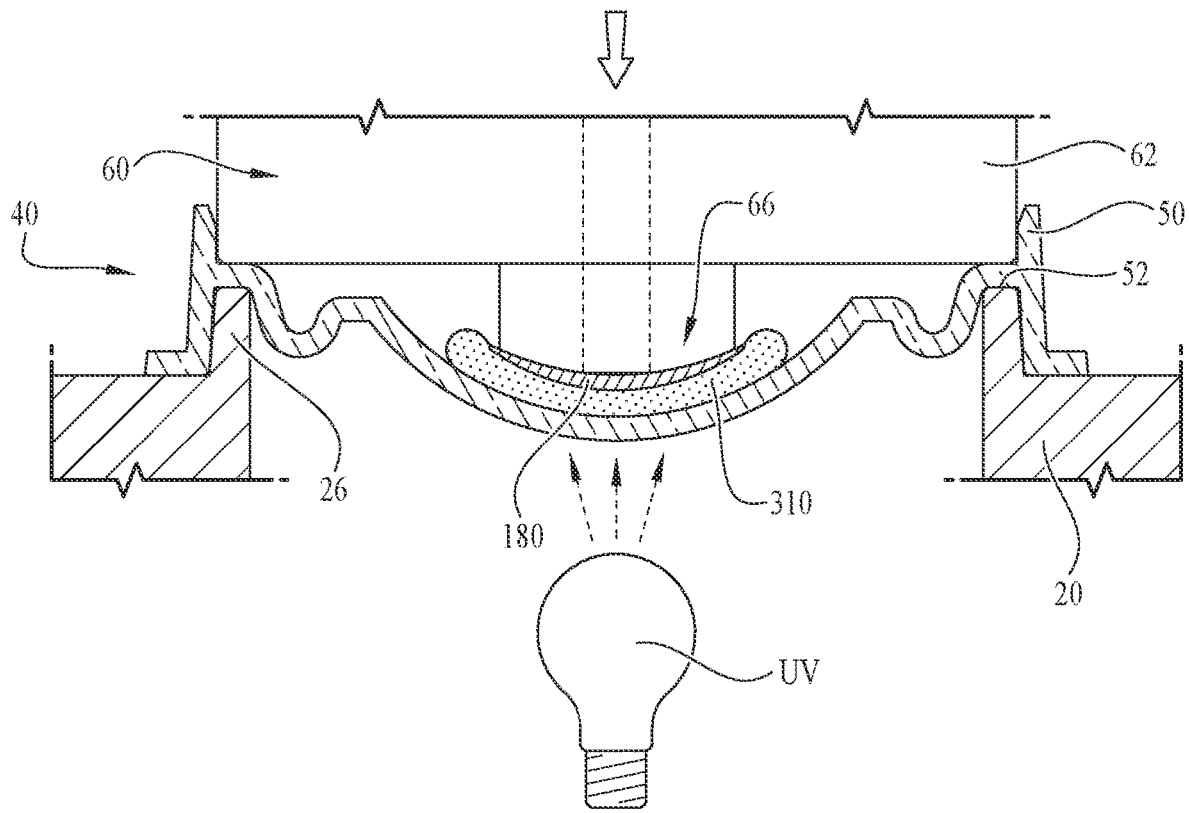

The insert placement and positioning device 60 then delivers and positions the lens insert 180 into the desired position within the mold 40, as shown in FIG. 4B.

The lens insert 180 is preferably precisely centered on the contact face 72 of the pick-up head 66 by a centering and pick-up process, for example as described above. Also, as described above, the radial (horizontal) positioning of the lens insert 180 is precisely controlled during placement due to the alignment and registration of the positioning housing 62 within the upright wall portion 50 of the mold 40. And the axial (vertical) positioning of the lens insert 180 is precisely controlled during placement by abutment or contact between the lower contact surface of positioning housing 62 against the upper positioning surface 44 of the mold 40. If necessary, the axial (vertical) positioning can be fine tuned by adjustment of the threaded coupling between the insert pick-up head 66 and the vacuum tube 64.

The first quantity of lens body forming material 310 may optionally be at least partially cured or stabilized while the lens insert 180 is retained in the desired position within the mold 40 by the placement and positioning device 60. For example, ultraviolet light from a light source UV may be directed through a light transmissive portion of the mold 40 to at least partially cure the lens body forming material 310 as shown in FIG. 4B. Alternatively, the lens body forming material 310 may be thermally cured by application of heat, cured by chemical catalyst, or otherwise at least partially cured or stabilized. Alternatively, if the uncured lens body forming material 310 is of sufficient viscosity, partial curing may be unnecessary.

Figure 4C:
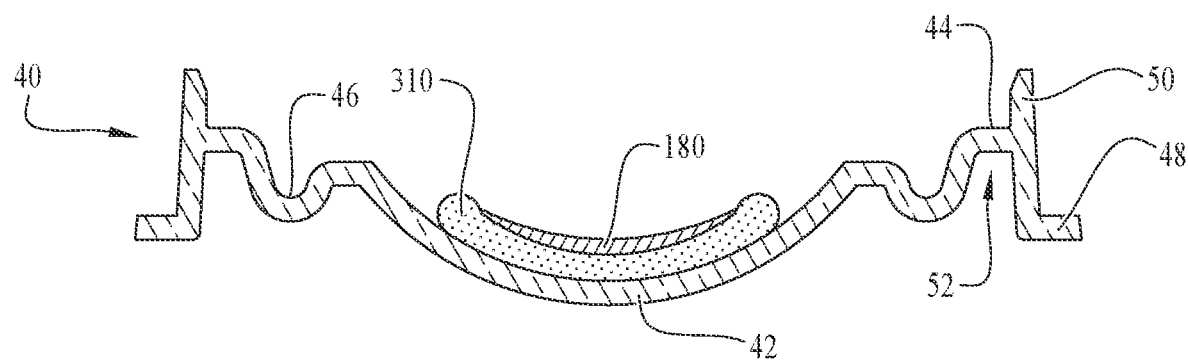

The vacuum or suction that was previously applied through the vacuum tube 64 and the at least one suction passage or opening 74 of the pick-up head 66 is then discontinued and any negative pressure is released to allow the lens insert 180 to separate from the contact face 72 of the pick-up head 66. Optionally a small positive pressure air delivery may be delivered through the vacuum tube 64 and the at least one suction passage or opening 74 to ensure separation of the lens insert 180 from the pick-up head 66. The insert placement and positioning device 60 is then raised out of engagement with the mold 40, leaving the lens insert 180 positioned on the first quantity of lens body forming material 310 as shown in FIG. 4C.

Figure 4D:
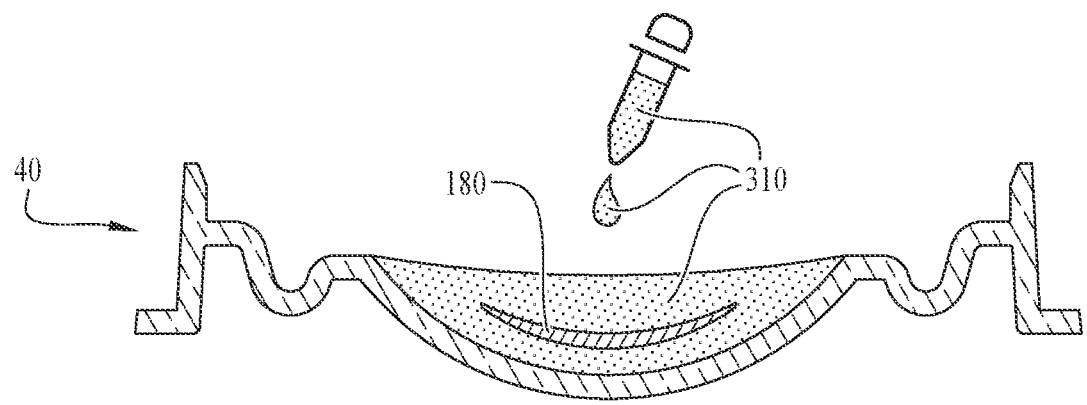
Figure 4E:
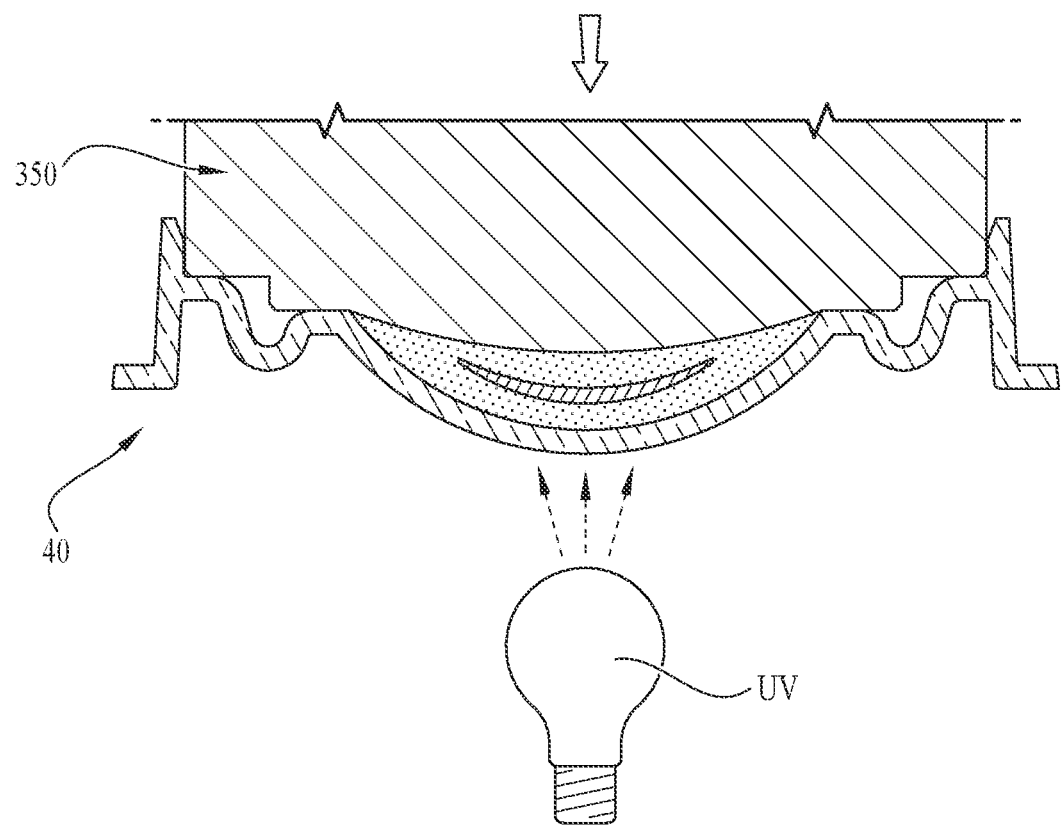
Figure 4F:
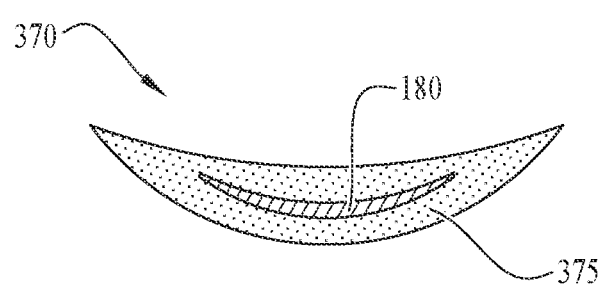

An additional second quantity of uncured lens body forming material 310 is then dosed or delivered to fill the mold receptacle 42 sufficiently to form the final lens product, as shown in FIG. 4D. A male or back curve mold portion 350 is then engaged with the female or back curve mold portion 40, and the lens body is fully cured for example by UV light, heat, or otherwise, as shown in FIG. 4E. The mold halves 40, 350 are then separated, and the final hybrid lens product 370 is demolded and removed for further treatment or use. As shown in FIG. 4F, the final hybrid lens product 370 includes the smaller lens insert 180, preferably fully embedded and covered by the larger overall lens body 375 formed of the cured lens body forming material 310, without any openings or discontinuities in the exterior surface of the lens as typically may occur in hybrid lenses produced with posts to support the lens insert during the molding process. As noted above, the lens insert 180 may be formed of a harder, softer, or otherwise different material than the larger overall lens body 375; may have a different refractive index or optical power; or may comprise a photochromic material, colorant or tinting, and/or incorporate electronic elements such as a sensor for glucose monitoring or active optics. In example embodiments, the lens insert may be formed of, comprise, consist of, or consist essentially of a first material; and the lens body may be formed of, comprise, consist of, or consist essentially of a second material different from the first material. In particular example embodiments, the hybrid product is a hybrid contact lens having a rigid gas permeable (RGP) lens insert fully enclosed or encapsulated by a silicone hydrogel (SiHy) carrier lens body, with intact external surfaces not having holes or discontinuities.

Figure 5A:
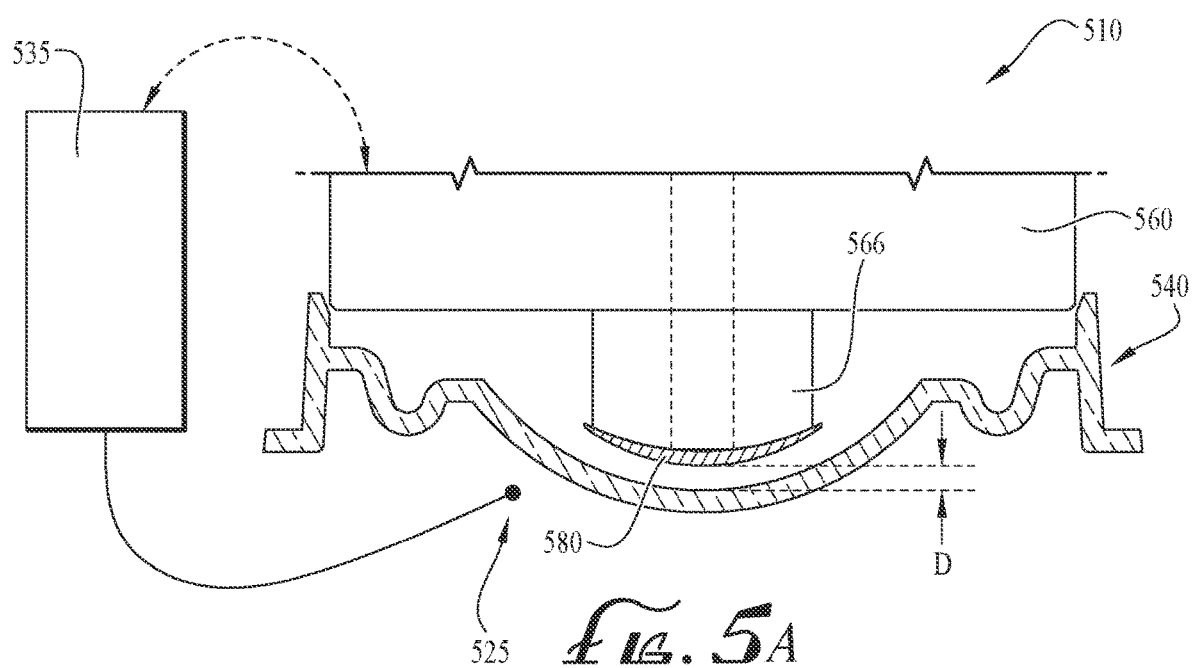
FIGS. 5A and 5B show insert placement and molding systems according to additional example embodiments of the present invention.

FIG. 5A shows another embodiment of an insert placement and molding system 510 according to an example embodiment of the present invention. Similar to the above-described system, a placement and positioning device 560 delivers a lens insert 580 carried on a pick-up head 566 for precise radial and axial positioning within a mold 540. Rather than utilizing alignment and registration contact between the mold and the positioning device for axial positioning however, system 510 includes a sensor or probe 525 to monitor the positioning of the lens insert 580 on the pick-up head 566 relative to the interior surface of the mold 540, and a feedback controller 535 to control the positioning of the placement and positioning device 560, and thus the spacing distance D between the lens insert and the mold. In example embodiments, the sensor and feedback controller are capable of measuring the position of either the fixture 560 and/or the insert 580 through the mold 540 and provide active feedback for an axial positioning system. After the lens insert is positioned the feedback probe may be moved and a curing light moved into position to cure the lens insert in place. Example sensors and systems that may be adapted for use may include low coherence interferometers (LCIs), such as for example Bristol Instruments 157 Series Optical Thickness Gauge non-contact thickness measurement system, Lumetrics OptiGauge II non-contact thickness measurement system or a Keyence CL-3000 Confocal displacement sensor.

Figure 5B:
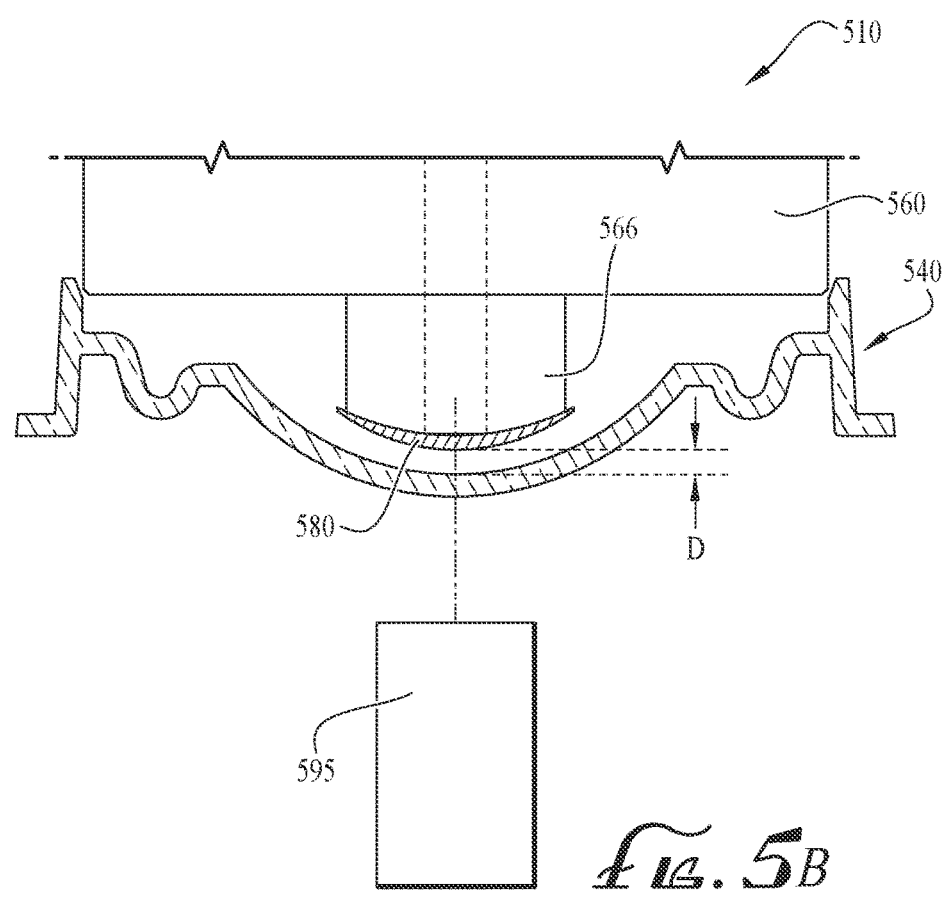

FIG. 5B shows another alternate embodiment of an insert placement and molding system incorporating a low-coherence interferometry (LCI) sensor 595 with active feedback control to position a lens insert carried on the tip of the pick-up head 566 relative to the interior surface of the mold 540, to control the positioning of the placement and positioning device 560, and thus the spacing distance D between the lens insert and the mold. The LCI measurement beam measures the distance D to optimally place the lens insert within the mold. Optionally, the axial (Y-axis) reference datum surfaces are not required or do not touch, as axial positioning of the lens insert relative to the mold is provided by the axial positioning system; whereas the radial (X-axis) reference datum surfaces may still be used for contact positioning of the lens insert relative to the mold.

FIG. 6 shows additional details of another example embodiment of an insert placement and positioning device 660. In this embodiment, a vacuum or suction tube or conduit 664 extends between an outer housing 675 and an external vacuum source. Vacuum or suction is delivered through the housing to at least one suction passage or opening in the insert contact face 672 of the insert pick-up head 666, which is carried on the positioning housing 662, to retain a lens insert on the contact face during placement.

Figure 7A:
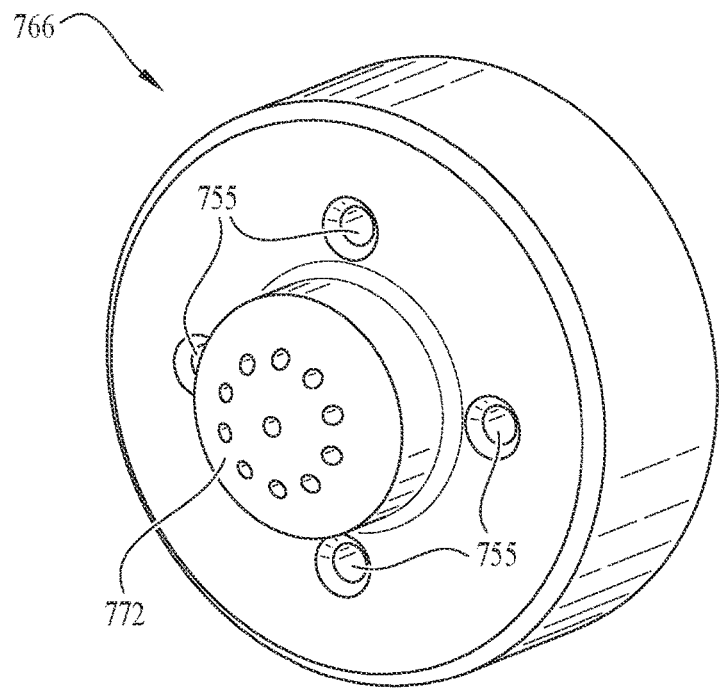
FIGS. 7A and 7B show further details of an insert pick-up head portion of an insert placement and positioning device according to an example embodiment of the present invention.
Figure 7B:
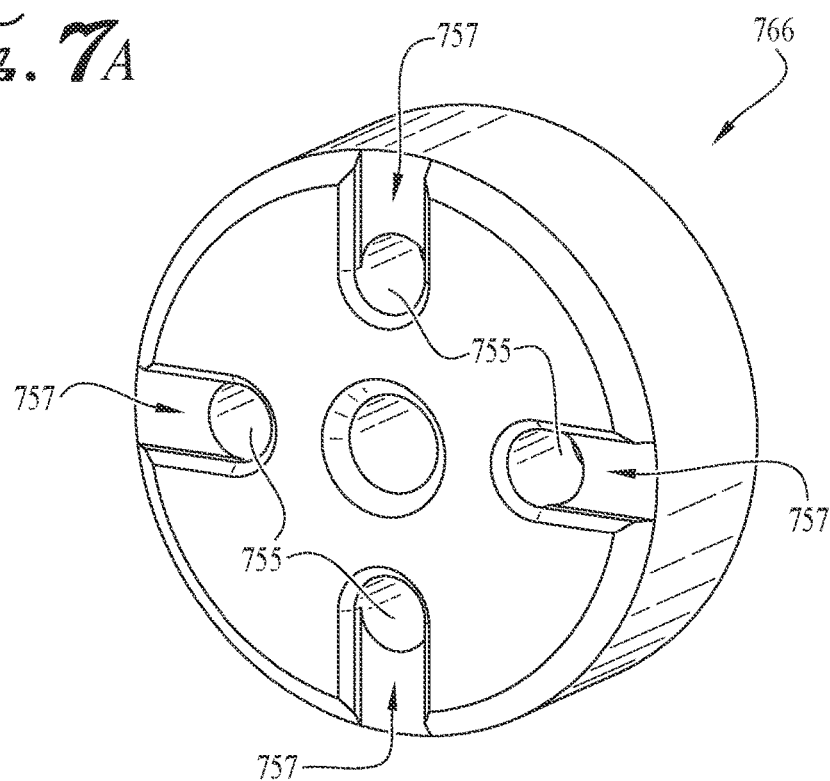

FIGS. 7A and 7B show further details of another example embodiment of an insert pick-up head 766 for use in connection with an insert placement and molding system according to the invention. In this embodiment, an array of a plurality of suction passages or openings are formed in the insert contact face 772. In particular, the array of openings comprises a ring of ten openings surrounding one central openings. In alternate embodiments, fewer or more openings, or differently configured arrays of openings may be utilized within the scope of the invention. Additionally, four larger relief openings 755 extend through the pick-up head between the front face (FIG. 7A) and the back face (FIG. 7B), and relief channels 757 are formed on the back face between the relief openings and the outer circumferential edge of the pick-up head. The openings 755 prevent air pressure build up when the fixture is inserted into the mold. Since the fixture may seal the edge of the mold, this could cause air to be trapped and prevent the fixture from properly seating on the hard stop. The openings 755 further serve as vents to reduce drag on the tip, as well as minimize the vacuum pressure between the mold and the tip that could cause the insert to move around. The channels 757 allow a vacuum pressure to be relieved by ensuring that holes 755 are not covered by the outer housing 675 in operation.

Figure 8:
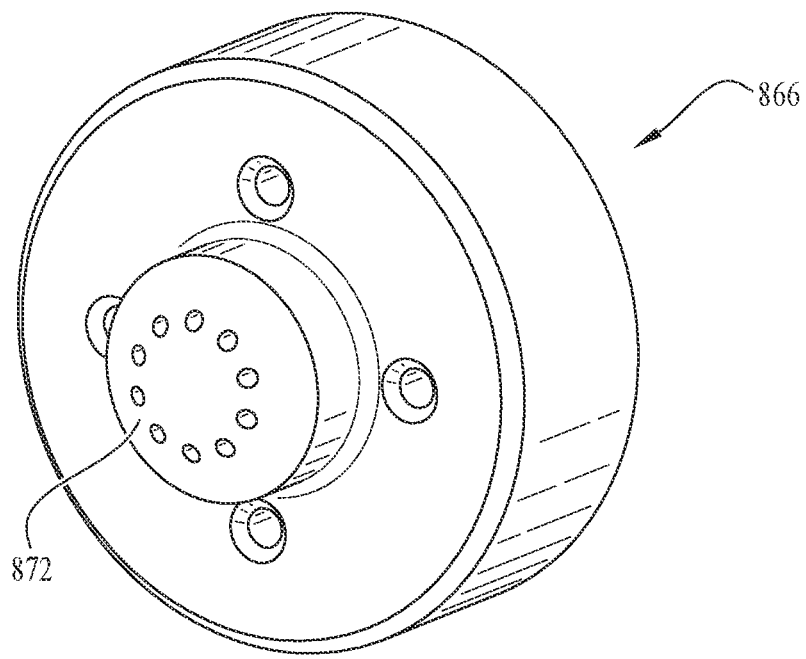
FIG. 8 shows an insert pick-up head portion for an insert placement and positioning device according to another example embodiment.
Figure 9:
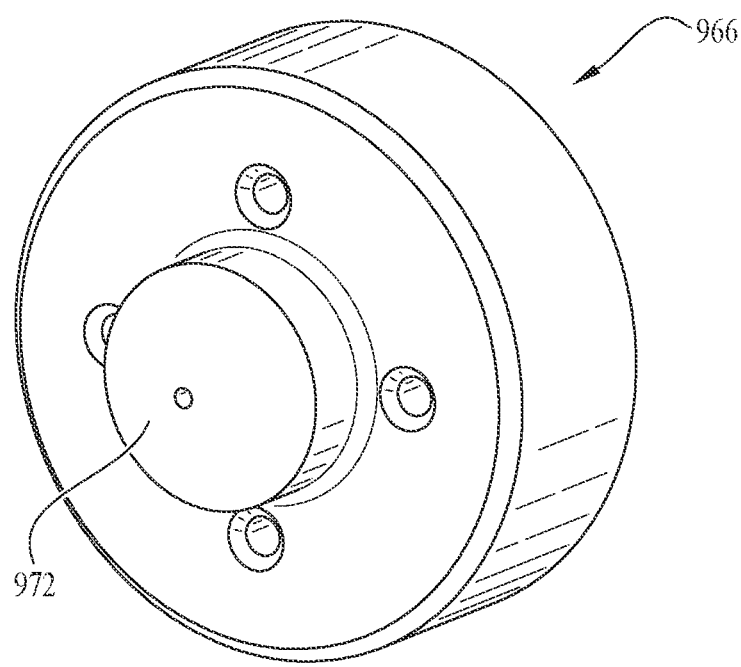
FIG. 9 shows an insert pick-up head portion for an insert placement and positioning device according to another example embodiment.

FIGS. 8 and 9 show additional example embodiments of insert pick-up heads 866 and 966 respectively for use in connection with an insert placement and molding system according to the invention. These embodiments include different configurations of suction opening arrays on their insert contact faces 872, 972, with FIG. 8 having an array of 10 openings in a ring, and FIG. 9 having one central opening. The hole patterns may be varied to optimize the size, positions, and number of holes based upon what yields the best process for a particular insert lens format. For example, too much negative pressure can dimple the insert lens, whereas too little and negative pressure may not provide sufficient holding and positioning of the insert lens on the pick-up head. Accordingly, the hole configurations of the pick-up head can be changed in order to improve contact of insert to tip, as well improve the stability of the insert when present on tip. In further embodiments, a differential pressure system is optionally provided for picking up the insert lens with a higher vacuum pressure and then switching to a very low vacuum pressure to ensure no dimpling occurs during placement and molding.

Figure 10:
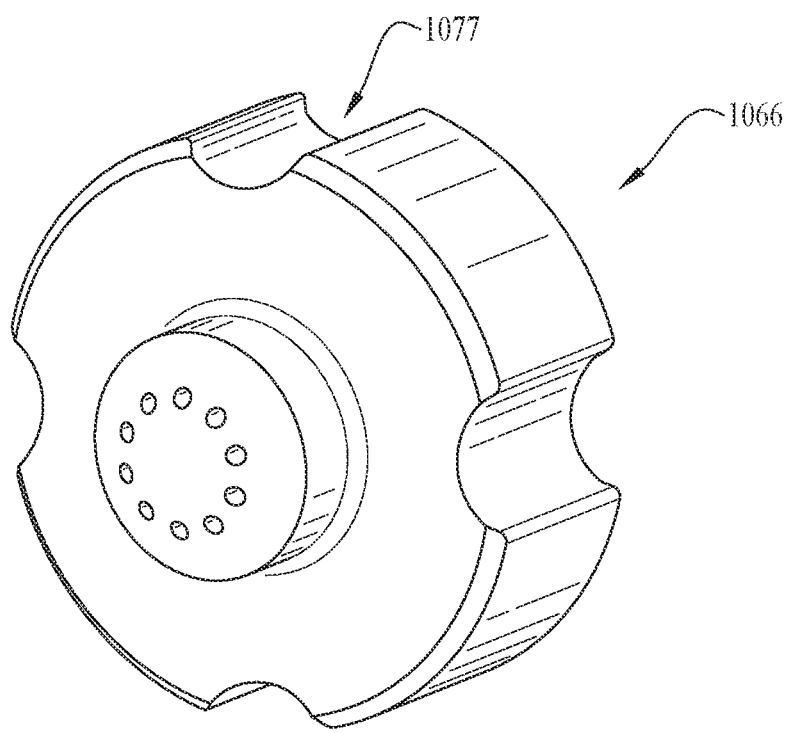
FIG. 10 shows an insert pick-up head portion for an insert placement and positioning device according to another example embodiment.
Figure 11:
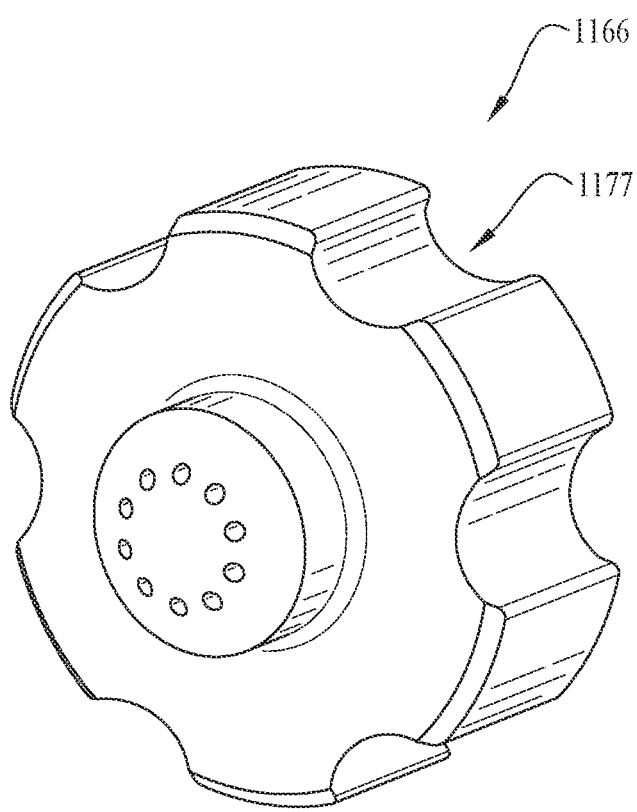
FIG. 11 shows an insert pick-up head portion for an insert placement and positioning device according to another example embodiment.

FIGS. 10 and 11 show additional example embodiments of insert pick-up heads 1066 and 1166 respectively for use in connection with an insert placement and molding system according to the invention. These embodiments include four pressure relief channels 1077 (FIG. 10) and six pressure relief channels 1177 (FIG. 11) extending axially along the circumferential sides of the pick-up heads, between their front and back faces.

FIG. 12 shows an arbor press pedestal 1210 and a mold 1240 according to further example embodiments of the invention. In example applications, the pedestal 1210 may be affixed to or form a part of a support base of an insert placement and molding system, such as for example the support base 20 of the above-described embodiments. The pedestal 1210 provides a secure locking engagement of the mold 1240 for improved stability when the insert placement and positioning device engages and disengages with the mold during placement and positioning of the lens insert. The mold 1240 is generally similar in form and function to the mold 40 of the above-described embodiment, with the addition of at least one pedestal locking engagement and disengagement member(s), which in the depicted example comprise a diametrically opposed pair of engagement flanges or wings 1245 extending radially or laterally outwardly from the external periphery of the mold. The pedestal 1210 comprises a top surface 1222 with a centrally positioned annular or ring-shaped inner collar 1226 extending upwardly from the top surface. The inner collar 1226 functions to engage a cooperative annular receiver channel of the mold 1240 for precise radial locational positioning of the mold relative to the pedestal, similar to the above-described embodiments. The pedestal 1210 further comprises an at least partially annular or ring-shaped outer locking engagement collar (in the depicted embodiment, two partially annular outer locking engagement collar segments or flanges 1233 are positioned at diametrically opposed locations on the pedestal 1210) arranged concentrically with the inner collar 1226 and extending upwardly from the top surface 1222. A diametrically opposed pair of rotationally symmetric and circumferentially oriented slots 1235 are formed between the top surface 1222 and each of the collar segments 1233.

In an example manner of use, the mold 1240 is axially placed, for example by axial operation of the insert placement and positioning device, onto the arbor press pedestal 1210 (FIGS. 12A-12B), with the wings 1245 of the mold positioned within diametrically opposed spaces or gaps between the outer locking engagement collar segments or flanges 1233 to engage the receiver channel of the mold onto the inner collar 1226 of the pedestal. The mold 1240 is then rotated or twisted, for example by rotational operation of the insert placement and positioning device, to engage the wings 1245 of the mold into the slots 1235 of the collar segments 1233 of the pedestal 1210 (FIGS. 12B-12C). Engagement of the wings 1245 within the slots 1235 functions to lock the mold 1240 in position and prevent or minimize axial movement of the mold relative to the pedestal 1210 during placement and positioning of the lens insert by engagement and disengagement of the insert placement and positioning device with the mold. After placement of the lens insert, the operation may be reversed to remove the mold 1240 from the pedestal 1210.

Example methods and associated equipment as disclosed herein may be utilized to fabricate hybrid products including hybrid contact lenses, such as for example a hybrid contact lens having a rigid gas permeable (RGP) lens insert fully enclosed or encapsulated by a silicone hydrogel (SiHy) carrier lens body, with intact external surfaces not having holes or discontinuities. In example forms, the fabricating methods use a specially designed vacuum pick tool to precisely place lens inserts in the desired location in the carrier molds, resulting hybrid lenses of intact surfaces. Precise placement of a lens insert is during the fabrication of hybrid contact lenses is advantageous. Having post structures on the front curve of the hybrid lens molds to support the inserts will leave holes on the surface of the hybrid lenses, making them prone to bacteria growth, which is disadvantageous. Example fabrication processes and systems according to the present invention may be used to precisely pick and place the insert in the desired position without the need of post structures. As a result, embedded lenses with intact surfaces can be made. Further, some example fabrication processes and systems according to the present invention may be implemented with minimum modification required to typical contact lens-making processes and systems. Additionally, some example fabrication processes and systems according to the present invention may use traditional contact lens molds to make hybrid contact lenses, with no mold change required. Example fabrication processes and systems according to the present invention may be used to fabricate next-generation contact lens products for astigmatism masking, diffractive multifocal, health monitoring, or other purposes and functions.

The radial accuracy of placement of an embedded element within a hybrid contact lens assembly is highly important to the performance of some particular lens assemblies. Example devices and processes according to the present invention allow precisely accurate placement of embedded elements to be accomplished by using the same locating surfaces on the insert creation mold, as well as the hybrid lens assembly construction mold to pick and then place the insert. Some example embodiments of the invention incorporate a mechanical only placement solution that achieves high radial and axial insert placement accuracy without complex active placement compensation schemes. In further example embodiments, active axial position feedback may be used with the same fixture to ensure micron level accuracy of placement of the inserts within the lens assembly. In some particular examples, the lens insert-interfacing surface of the insert placement and positioning device will have a matching profile to the back side design of the lens insert to ensure minimal deformation of the insert (which may be important for optical elements) and to form a vacuum seal to prevent ingress of lens body liquid formulation into the vacuum system. The vacuum pickup head may include single or multiple holes to optimize the pickup, placement, and curing processes. Placement of the insert within the hybrid lens assembly is a difficult challenge to control with good radial and height position. Example systems and methods of the present invention leverage the insert creation accuracy to enhance the accuracy placement of the insert. For example, a vacuum tip of the insert lens pickup head may remove an insert lens from a mold and place it accurately in the center of another mold to be embedded within a lens body formulation, while holding it in place for UV curing. Some example systems and methods according to the present invention advantageously provide a mechanically simple and scalable solution to the insert placement problems recognized with previously known systems and methods for fabricating hybrid lens products.

While the invention has been described with reference to example embodiments, it will be understood by those skilled in the art that a variety of modifications, additions and deletions are within the scope of the invention, as defined by the following claims.

What is claimed is:

1. An insert placement and molding system for fabricating a hybrid contact lens product having a lens insert embedded within a lens body, the lens insert comprising a first material and having a concave back surface and an opposite convex front surface, and the lens body comprising a second material different from the first material, wherein the insert placement and molding system comprises:
    a lens forming mold element which is a female mold half having a circular and concave central mold receptacle and a circumferential flange defining an internal geometry and surrounding the central mold receptacle;
    a mold engagement and support base comprising a body having a planar top and a bottom surface and at least one mold engagement feature configured to engage a lens forming mold element and retain the lens forming mold element in a substantially fixed position relative to the mold engagement and support base;
    an insert placement and positioning device comprising a positioning housing, a suction conduit connected to an external suction source and extending centrally and axially through the positioning housing from top to base, an insert pick-up head mounted to the suction conduit, and a positioning ring coupling the suction conduit with the positioning housing at the top of the positioning housing, wherein the insert pickup head comprises an insert contact face configured for cooperative releasable engagement of the lens insert, at least one suction opening in fluid communication with the suction conduit, and at least one pressure relief channel, wherein the positioning housing comprises at least one positioning feature which comprises an external geometry and outside diameter around its base that is configured for a clearance or interference fit within the internal geometry of the circumferential flange of the lens forming mold element to provide precise locational positioning of the insert pickup head relative to the lens forming mold element both in an axial dimension and in a transverse dimension orthogonal to the axial dimension; and
    a centering jig for positioning the lens insert for pickup by the insert placement and positioning device.

2. The system of claim 1, wherein the at least one mold engagement feature comprises a collar projecting axially from the planar top surface of the mold engagement and support base, the collar being configured for engagement within a cooperatively configured receiver of the lens forming mold element.

3. The system of claim 2, wherein the collar comprises an at least partially annular structure and projects axially upward from the planar top surface of the mold engagement and support base.

4. The system of claim 3, wherein the female mold half comprises an annular rim with a flat upper positioning surface surrounding the central mold receptacle near the outer periphery of the female mold half, and a peripheral recess surrounding the central mold receptacle adjacent the rim, wherein the female mold half comprises a L-shaped external circumferential flange when viewed in cross-section having a horizontal base ring portion and a vertical upright cylindrical or tubular wall portion, wherein the female mold half comprises an inverted annular recess beneath the upper positioning surface and between the peripheral recess and the upright wall portion forms a receiver for engagement over the collar of the mold engagement and support base when the female mold half is mounted onto the mold engagement and support base.

5. The system of claim 4, wherein the lens forming mold element at least partially comprises a UV-transmissive material.

6. The system of claim 4, wherein the lens forming mold element comprises a diametrically opposed pair of engagement wings, and wherein at least one mold engagement feature of the mold engagement and support base comprises a diametrically opposed pair of slots, each slot configured to receive a corresponding engagement wing.

7. The system of claim 1, wherein the positioning ring comprises a locking nut that can be manually loosened and tightened by hand to allow adjustment and locking of the axial position of the insert pick-up head relative to the positioning housing, and.

8. The system of claim 1, wherein the body of the mold engagement and support base is cylindrical in shape and comprises at least one partially annular or ring-shaped collar extended upwardly from the planar top surface and an open chamber extending through the body to a top opening bounded by the collar.

9. The system of claim 1, wherein the insert contact face comprises a smoothly radiused a convex surface configured to match and closely conform to the back surface of the lens insert.

10. The system of claim 1, wherein the insert pickup head is positionally adjustable relative to the positioning housing.

11. The system of claim 10, wherein the positional adjustment of the insert pickup head relative to the positioning housing is provided by a threaded coupling between the insert pickup head and the suction conduit.

12. The system of claim 1, wherein the insert pickup head comprises a plurality of suction openings in fluid communication with the suction conduit.

13. The system of claim 12, wherein the plurality of suction openings are arranged in a circular array.

14. The system of claim 1, further comprising one additional lens forming element which is a male mold half.

15. The system of claim 1, further comprising an insert mold for forming the lens insert.

16. The system of claim 1, wherein the centering jig comprises a cylindrical housing with a chamfered top opening, a floor at bottom, a cylindrical sidewall, and a recess formed at the center of the floor and concentric with the cylindrical housing, wherein the recess has a size and shape closely conforming to the size and shape of the lens insert.

17. The system of claim 1, further comprising dosing means for delivery of the second material to the lens forming mold element.

18. The system of claim 1, further comprising energy delivery means for curing the second material within the lens forming mold element.

19. The system of claim 1, further comprising a vacuum source for delivery of suction through the suction conduit.

20. The system of claim 1, further comprising a sensor and feedback controller configured to position the insert pickup head relative to the lens forming mold element.

21. The system of claim 20, wherein the sensor comprises a low coherence interferometer sensor.

22. An insert placement and positioning device for precisely positioning a lens insert relative to a lens forming mold element having a circumferential flange defining an internal geometry to fabricate a hybrid contact lens product, the insert placement and positioning device comprising: a positioning housing; a suction conduit connected to an external suction source and extending centrally and axially through the positioning housing from top to base; an insert pick-up head mounted to the suction conduit; and a positioning ring coupling the suction conduit with the positioning housing at the top of the positioning housing,
wherein the insert pick-up head comprises an insert contact face configured for cooperative releasable engagement of the lens insert, and at least one suction opening formed in the insert contact face;
wherein the positioning housing comprises at least one positioning feature which comprises an external geometry and outside diameter around its base that is configured for a clearance or interference fit within the internal geometry of the circumferential flange of the lens forming mold element to provide precise locational positioning of the insert pickup head relative to the lens forming mold element both in an axial dimension and in a transverse dimension orthogonal to the axial dimension; and
wherein the suction conduit is in fluid communication with the at least one suction opening formed in the insert contact face.

23. The device of claim 22, wherein the positioning ring comprises a locking nut that can be manually loosened and tightened by hand to allow adjustment and locking of the axial position of the insert pick-up head relative to the positioning housing.

24. The device of claim 22, wherein the insert contact face comprises a smoothly radiused convex surface configured to match and closely conform to a concave surface of the lens insert.

25. The device of claim 22, wherein the insert pickup head is positionally adjustable relative to the positioning housing.

26. The device of claim 25, wherein the positional adjustment of the insert pickup head relative to the positioning housing is provided by a threaded coupling between the insert pickup head and the suction conduit.

27. The device of claim 22, wherein the insert pickup head comprises a plurality of suction openings in fluid communication with the suction conduit.

28. The device of claim 27, wherein the plurality of suction openings are arranged in a circular array.

* * * * *